US012609826B2

(12) United States Patent
sRee Krishna

(10) Patent No.: US 12,609,826 B2
(45) Date of Patent: Apr. 21, 2026

(54) COMMUNICATION VALIDATION

(71) Applicant: Wells Fargo Bank, N.A., San Francisco, CA (US)

(72) Inventor: Sridharan sRee Krishna, Karnataka (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 84 days.

(21) Appl. No.: 18/436,550

(22) Filed: Feb. 8, 2024

(65) Prior Publication Data

US 2025/0260578 A1     Aug. 14, 2025

(51) Int. Cl.
*H04L 9/32* (2006.01)
*G06K 19/06* (2006.01)

(52) U.S. Cl.
CPC ...... *H04L 9/3226* (2013.01); *G06K 19/06037* (2013.01)

(58) Field of Classification Search
CPC .......................... H04L 9/3226; G06K 19/06037
See application file for complete search history.

(56) References Cited

U.S. PATENT DOCUMENTS

| | | |
|---|---|---|
| 2006/0123464 A1 | 6/2006 | Goodman et al. |
| 2007/0133602 A1 | 6/2007 | Russell |
| 2007/0260544 A1 | 11/2007 | Wankmueller |
| 2012/0254333 A1 | 10/2012 | Chandramouli et al. |

| | | | |
|---|---|---|---|
| 2013/0054964 A1 | 2/2013 | Messerges et al. | |
| 2017/0063756 A1* | 3/2017 | Zhuang ................... | H04L 51/42 |
| 2020/0396248 A1 | 12/2020 | Lee | |
| 2021/0042754 A1 | 2/2021 | Mossoba et al. | |
| 2022/0383315 A1* | 12/2022 | Eisen ................... | G06K 7/1095 |
| 2022/0400094 A1* | 12/2022 | Sampath ................ | G06F 40/30 |
| 2023/0046351 A1* | 2/2023 | Silaev ................... | G07F 17/329 |

(Continued)

FOREIGN PATENT DOCUMENTS

| | | |
|---|---|---|
| CN | 115051810 A | 9/2022 |
| EP | 1887754 B1 | 12/2012 |
| KR | 20230111104 A | 7/2023 |

(Continued)

OTHER PUBLICATIONS

Yang-Wai Chow et al., "Authentication and transaction verification using QR codes with a mobile device," University of Wollongong, caseyc@uow.edu.au, https://ro.uow.edu.au/cgi/viewcontent.cgi?article=7205&context=eispapers, Jan. 1, 2026, 16 pages.

(Continued)

*Primary Examiner* — Azizul Choudhury
(74) *Attorney, Agent, or Firm* — Merchant & Gould P.C.

(57) ABSTRACT

An example computer system for authenticating an electronic communication can include: one or more processors; and non-transitory computer-readable storage media encoding instructions which, when executed by the one or more processors, causes the computer system to create: a notification module programmed to generate a validation code for the electronic communication; and a fraud validation module programmed to accept the validation code and other contextual information associated with the electronic communication to determine an authenticity of the electronic communication.

16 Claims, 8 Drawing Sheets

(56)  References Cited

U.S. PATENT DOCUMENTS

2023/0299595 A1* 9/2023 Mossoba ............. H02J 7/00045
307/104
2023/0344653 A1* 10/2023 Vestemean ................ H04L 9/30

FOREIGN PATENT DOCUMENTS

KR      20230149958 A    10/2023
TW          I789971 B     1/2023
WO       2006029222 A2    3/2006

OTHER PUBLICATIONS

Aj, "All about the QR code / e invoice verifying app," https://
cleartax.in/s/qr-code-verify-app-e-invoicing, Jun. 9, 2023,15 pages.
Sandhya, Mishra et al., "DSmishSMS-A System to Detect Smishing
SMS," https://link.springer.com/article/10.1007/s00521-021-06305-
y, Neural Computing and Applications (2023) 35:4975-4992.

* cited by examiner

100

Client Device 102

Network 110

Server device 112

Notification database 114

112

Notification module
202

Fraud validator module
204

Reporting module
206

Administration module
208

From: info@mybank.com
To: johndoe@email.com
Sent: 2024 01 13 13:41
Subject: Update your account details Dear John,    304

As per recent regulation changes, we need you to confirm your address in our records. Please scan the QR code below using your banking application to validate this communication and provide the necessary information.

310

600

602

Receive electronic communication

604

Access banking application

606

Scan QR code on electronic communication

608

Receive confirmation that electronic communication is authentic

610

Perform desired action requested by electronic communication

COMMUNICATION VALIDATION

BACKGROUND

Individuals can be bombarded with electronic communications. They can come through electronic mail, text messages, third party messaging services, and the like. It can be difficult for individuals to determine which electronic communications are genuine, since nefarious actors craft their fraudulent messages to look like they originate from authentic sources. It is therefore possible for individuals to fall for fraudulent communications, which exposes them to financial losses.

SUMMARY

Examples provided herein are directed at validating communications to minimize fraud.

According to aspects of the present disclosure, an example computer system for authenticating an electronic communication can include: one or more processors; and non-transitory computer-readable storage media encoding instructions which, when executed by the one or more processors, causes the computer system to create: a notification module programmed to generate a validation code for the electronic communication; and a fraud validation module programmed to accept the validation code and other contextual information associated with the electronic communication to determine an authenticity of the electronic communication.

According to another aspect, an example method for authenticating an electronic communication can include: generating a validation code for the electronic communication; and accepting the validation code and other contextual information associated with the electronic communication to determine an authenticity of the electronic communication.

The details of one or more techniques are set forth in the accompanying drawings and the description below. Other features, objects, and advantages of these techniques will be apparent from the description, drawings, and claims.

DESCRIPTION OF THE DRAWINGS

FIG. 2 shows example logical components of a server device of the system of FIG. 1.

DETAILED DESCRIPTION

This disclosure relates to validating electronic communications to minimize fraud.

Individuals may receive electronic communications from many sources. In the examples provided herein, the communications may come from a financial institution. However, the concepts are applicable to any electronic communications received by an individual.

In these examples, the electronic communications may take many forms. Examples of such communications include electronic mail, text messages (Short Messaging Service (SMS) and Multimedia Messaging Service (MMS)), iMessages, Google Chat messages, WhatsApp messages, Facebook messages, etc. When the individual receives an electronic message, the individual can use the concepts described herein to determine that the electronic message is authentic or fraudulent. Further, the examples provide the individual with an efficient mechanism to report fraudulent electronic communications.

Figure 1:
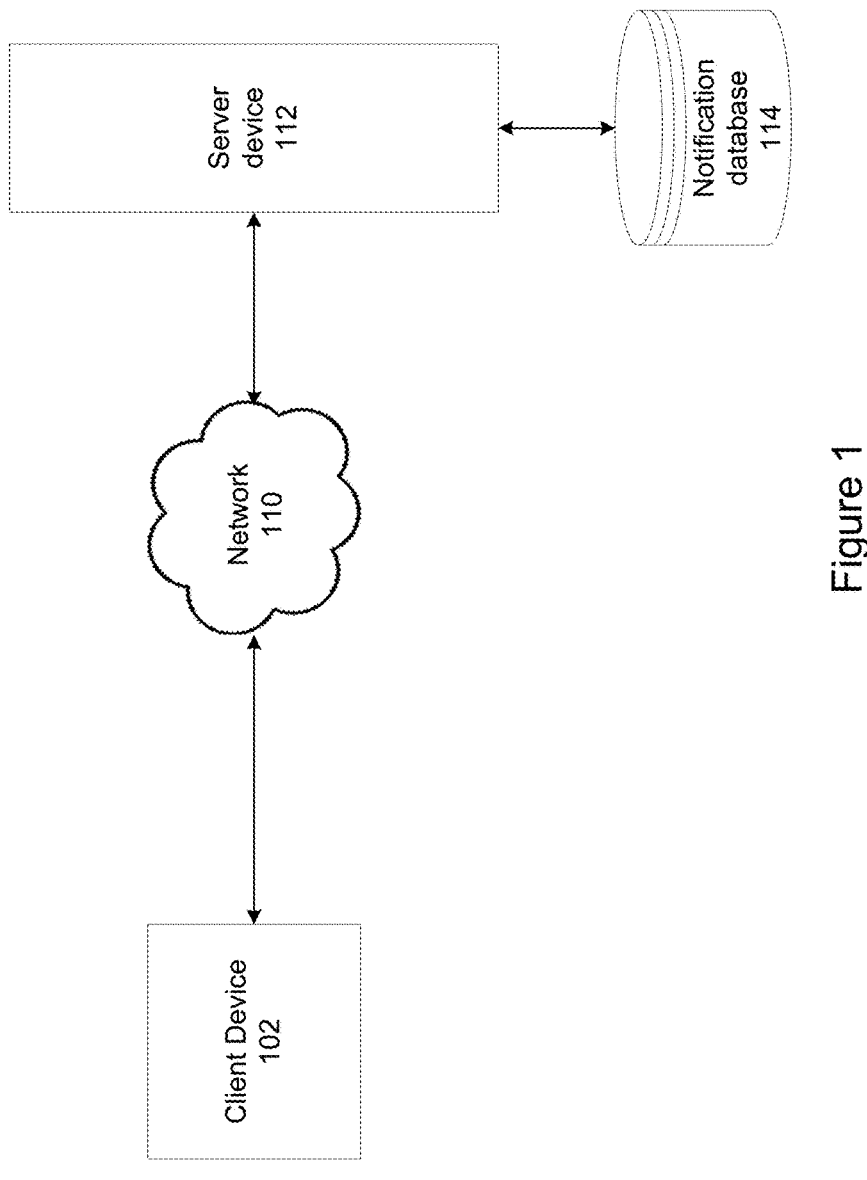
FIG. 1 shows an example system for validating electronic communications.

FIG. 1 schematically shows aspects of one example system 100. Generally, the system 100 can be a typical computing environment that includes a client device 102 and a server device 112. The client device 102 communicates with the server device 112 through a network 110 to accomplish tasks.

The client device 102 and the server device 112 may be implemented as one or more computing devices with at least one processor and memory. Example computing devices include a mobile computer (such as a smartphone), a desktop computer, a server computer, or other computing device or devices such as a server farm or cloud computing used to generate or receive data.

For example, in one embodiment, the server device 112 is one or more computers (typically a server farm or part of a cloud computing environment) that facilitates various processes of a financial institution. In this example, the server device 112 is programmed to communicate with a notification database 114, as provided in more detail below.

In the examples shown, the client device 102 can be used by customers of the financial institution to perform various tasks. For instance, the client device 102 can include a software application programmed to conduct financial services tasks, such as making payments, checking balances of accounts, transferring money, etc. The client device 102 can also be programmed to receive electronic communications from various sources, including the financial institution.

Figure 2:
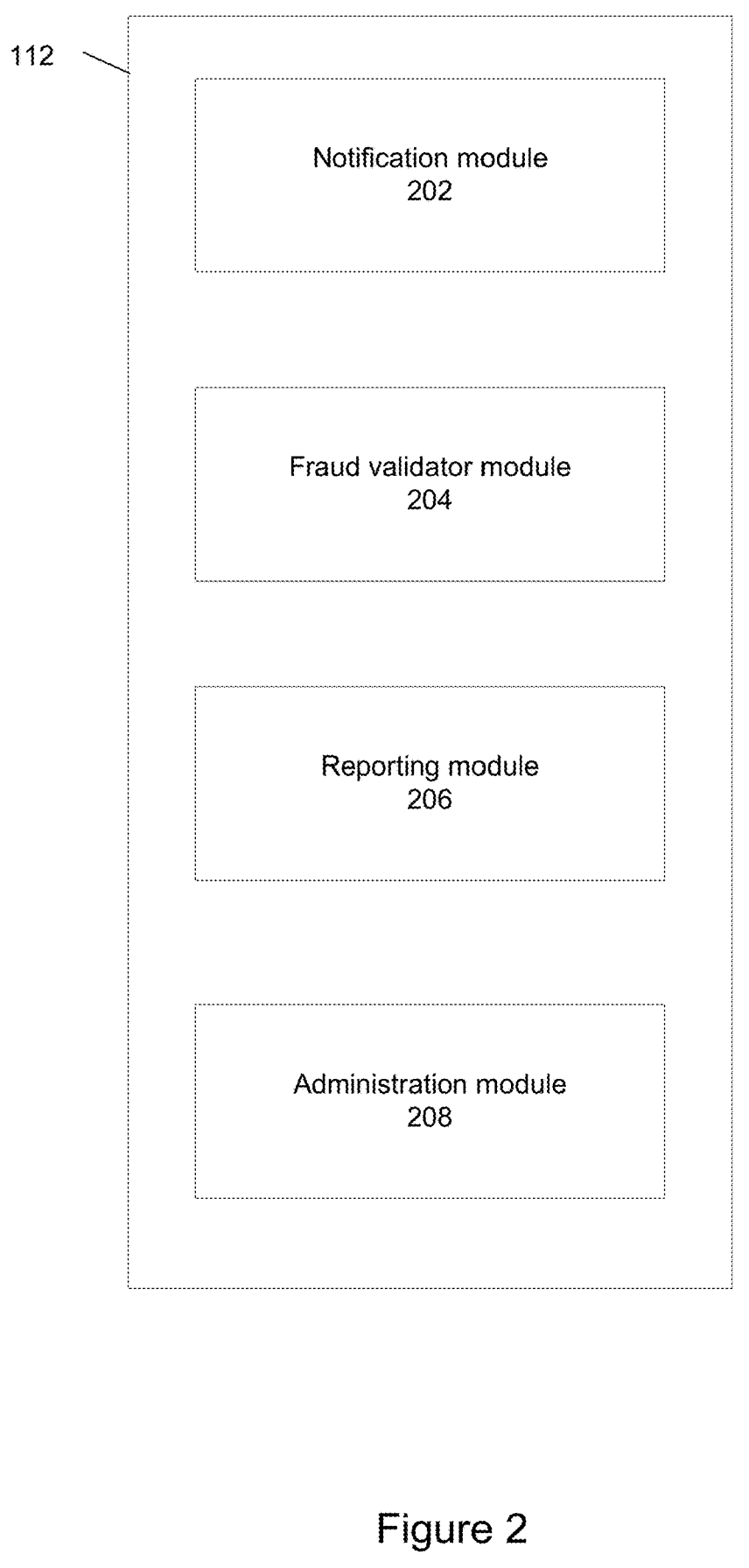

Referring now to FIG. 2, additional details of the server device 112 are shown. In this example, the server device 112 is programmed to include a notification module 202, a fraud validator module 204, a reporting module 206, and an administration module 208. Fewer and/or additional functionality can be provided in alternative embodiments.

The example notification module 202 is programmed to generation validation codes to be included in electronic communications with individuals, such as customers of the financial institution. More specifically, in one example embodiment, the notification module 202 can be accessed through an application programming interface (API) to generate a notification entry in the notification database 114 for each electronic communication that is sent by the financial institution to a customer. An example entry can include such information as the following.

| Notification number | Validation code | Type | Sent to | Date | Time | Action requested |
|---|---|---|---|---|---|---|
| 10000 | 54Xeif9282 | Email | johndoe@email.com | 2024 Jan. 13 | 13:41 | Update address |

The example notification number can be a unique number assigned to the notification entry, such as a globally unique identifier (GUID). The example validation code is a set of characters, such as numbers, letters, and/or symbols, which is used to authenticate the electronic communication, as described further below. The other fields in the notification entry relate to contextual information associated with the electronic communication, such as to whom it was sent, what date/time, and the action requested in the notification. Many other types of information can also be captured.

A notification entry for each electronic communication is created by the notification module 202 and stored in the notification database 114. As described further below, the notification entry for each electronic communication can be used to authenticate the communication.

The validation code generated by the notification module 202 can be appended to an electronic communication in various ways. For instance, the validation code can be incorporated into the data associated with a quick-response (QR) code. Such data can include the address for validation (e.g., the address of the fraud validator module 204 as described below) and/or some or all the information captured in the entry defined above.

For instance, in one example, the notification module 202 generates a QR code with data including the address of the fraud validator module 204 (e.g., URL or IP address) along with the validation code and contextual information associated therewith, like the type of communication, to whom it was sent, at what date/time, and the action requested. This data can further be encrypted before it is incorporated into the QR code so that access to the data is limited, as described further below. The QR code is thereupon included with the electronic communication that is sent to the individual, as described further below. See FIG. 3. The validation codes can be presented in other formats as well. See FIG. 7.

The example fraud validator module 204 is programmed to receive data relating to electronic communications to authenticate them. In this example, a request is generated by the client device 102 to authenticate an electronic message received by the individual. This request can take various forms, such as the data extracted from a QR code and/or a validation code.

Figure 3:
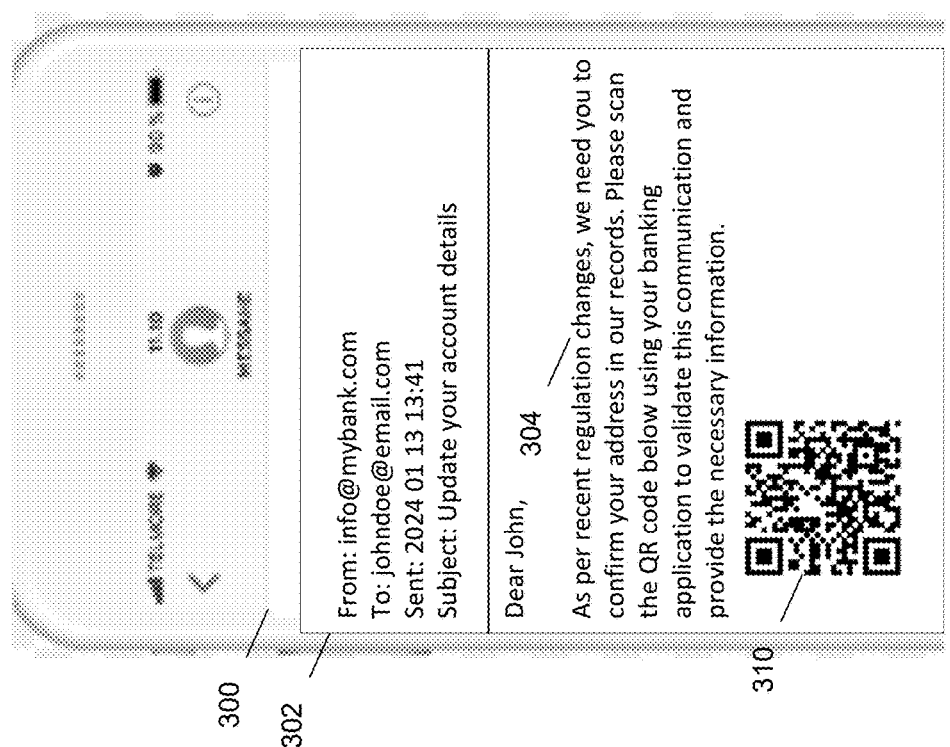
FIG. 3 shows an example graphical user interface of a client device of the system of FIG. 1.

For instance, FIG. 3 shows an example interface 300 of the client device 102. The interface 300 includes an example electronic mail 302 that is received by the individual. The electronic mail 302 includes a message 304 for the individual, which explains the purpose of the communication. In this instance, the electronic mail 302 was sent to request that the individual update her address.

The example electronic mail 302 also includes a QR code 310 that can be used to validate the authenticity of the electronic mail 302. The message 304 indicates that the individual can validate the electronic mail 302 using a banking application on the client device 102.

In example embodiments, the banking application is provided for download to the client device 102, such as in a marketplace like the App Store on iOS and Google Play on Android. Once installed on the client device 102, the banking application can provide typical banking functionality, like making payments, accessing checking/savings/card accounts, transferring money, etc. The banking application can also be programmed to validate electronic communications.

For instance, the electronic mail 302 can be authenticated by scanning the QR code 310 using the banking application on the client device 102. Since the data within the QR code 310 is encrypted, the banking application on the client device 102 can unencrypt and access the data because it is provided with the proper tools (e.g., encryption key(s)) to do so by the server device 112 (or other computing device associated with the financial institution).

Once the data is decrypted by the banking application, the client device 102 uses this information to communicate with the fraud validator module 204. When the fraud validator module 204 receives the data from the client device 102, the fraud validator module 204 uses the validation code to query the notification database 114 to access notification entry associated with the communication that is stored therein. The fraud validator module 204 thereupon compares the data provided by the client device 102 with the data in the entry from the notification database 114.

Figure 4:
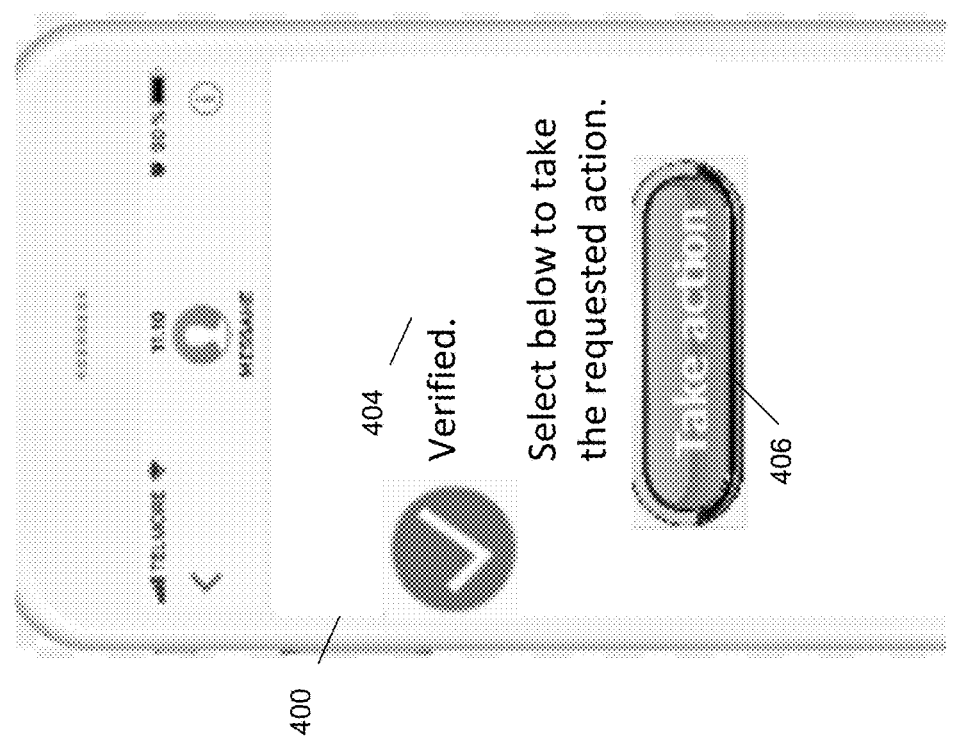
FIG. 4 shows another example graphical user interface of the client device of the system of FIG. 3.

When the data sent from the client device 102 matches the data in the notification entry, the fraud validator module 204 indicates that the electronic mail 302 is authentic. This is communicated back to the client device 102, which then displays an interface 400, as shown in FIG. 4. In this interface 400, the positive authentication of the electronic mail 302 is indicated by text 404 and/or visually through color and graphics (e.g., green color and checkmark).

Further, the example interface 400 rendered on the client device 102 provides an action control 406. The action control 406 can be selected by the individual (e.g., by clicking) to take the action requested in the electronic mail 302. In this instance, once the action control 406 is selected, the client device 102 can be programmed to take the individual to another interface to allow the individual to update her address per the request in the electronic mail 302.

Alternatively, when the data sent from the client device 102 fails to match the data in the notification entry, the fraud validator module 204 indicates that the electronic mail 302 is possibly fraudulent. Examples of such failures to match include providing an improper validation code and/or having a proper validation code but failing to provide other information associated with the communication from the notification entry, such as the time sent and to whom.

Figure 5:
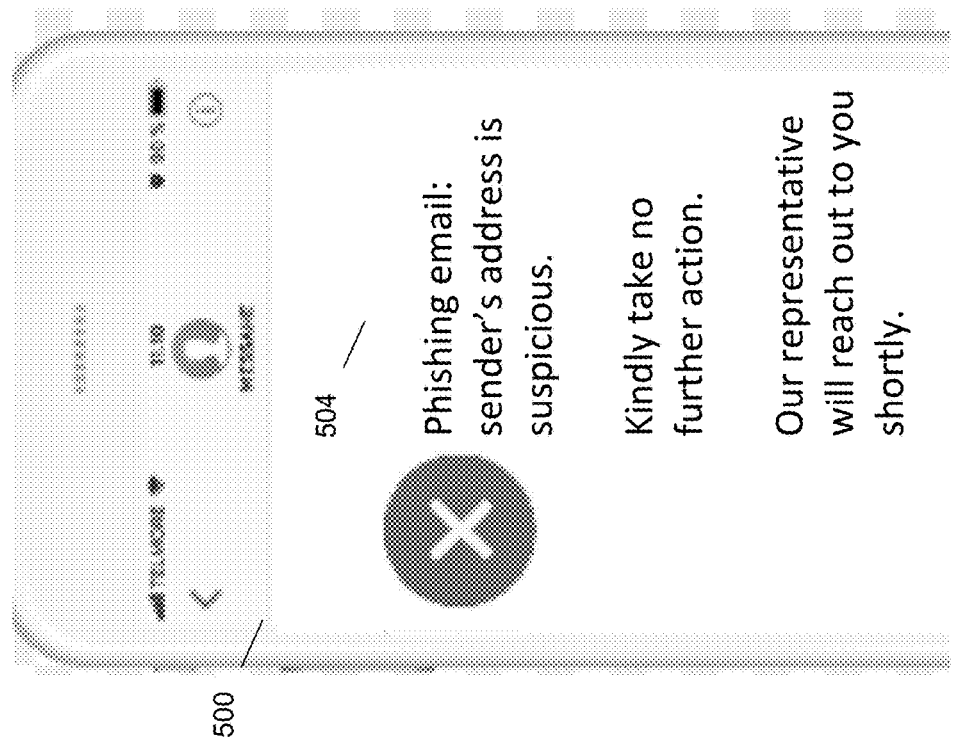
FIG. 5 shows another example graphical user interface of the client device of the system of FIG. 4.

This is communicated back to the client device 102, which then displays an interface 500, as shown in FIG. 5. In this interface 500, the possible fraudulent nature of the electronic mail 302 is indicated by text 504 and/or visually through color and graphics (e.g., red color and stop sign).

The text 504 can also provide directions for the individual, such as a caution not to proceed and an indication that a customer service representative from the financial institution will contact the individual. In other examples, the interface 500 can also collect other information about the electronic mail 302 for fraud reporting purposes, such as information about from whom the electronic mail was sent, when it was sent, and possibly capturing an image or native copy of the communication. This can be used for fraud reporting purposes by the reporting module 206, as described further below.

In some examples, the fraud validator module 204 can be programmed to apply artificial intelligence when making a determination of whether a particular electronic communication is authentic or fraudulent. For instance, the fraud validator module 204 can be trained on historical communications that have been determined to be authentic and fraudulent. When the fraud validator module 204 receives information associated with a present communication, such as the sender, date, time, and action requested, the fraud validator module 204 can use artificial intelligence to calculate a fraud score.

The fraud validator module 204 can then use this fraud score to determine if an electronic communication is likely fraudulent. For instance, when the artificial intelligence determines a fraud score that exceeds a threshold, the fraud validator module 204 determines that the electronic communication is likely fraud and therefore notifies the user of the same (see FIG. 5).

For example, the fraud validator module 204 can receive information associated with a communication that includes a valid validator code and correct date/time for the electronic mail according to the notification entry. However, the sender may not match what is indicated in the notification entry. Each field can be provided a score, and failures to match are summed until a threshold is reached. With the failure to match the sender given a higher score than other fields (e.g., the date or time), the fraud validator module 204 may set a fraud score indicating that the communication is fraudulent. Many other configurations are possible.

The example reporting module 206 is programmed to capture, log, and visualize the functioning of the system 100. For instance, the reporting module 206 can capture information about the number of electronic communications that are authenticated. In addition, the reporting module 206 captures information regarding the electronic communications that are determined to be fraudulent.

For instance, the reporting module 206 can generate a dashboard that shows various information about the system 100, like the number of notifications generated, the number of electronic communications processed, and information about any trends that may develop. For instance, the dashboard can identify the senders of fraudulent electronic communications and provide volumes associated therewith. In this manner, trends in the fraudulent communications can be developed and visualized. Many configurations are possible.

The example administration module 208 is programmed to manage the overall administration of the system 100. For instance, the administration module 208 can control access by adding and removing users to the system 100 to allow them to manage the notification entries and authentication of the electronic messages. The administration module 208 can also be programmed to configure how the system 100 functions, such as by manipulating the thresholds for the fraud score to determine what electronic communications are deemed to be fraudulent. Many other configurations are possible.

Figure 6:
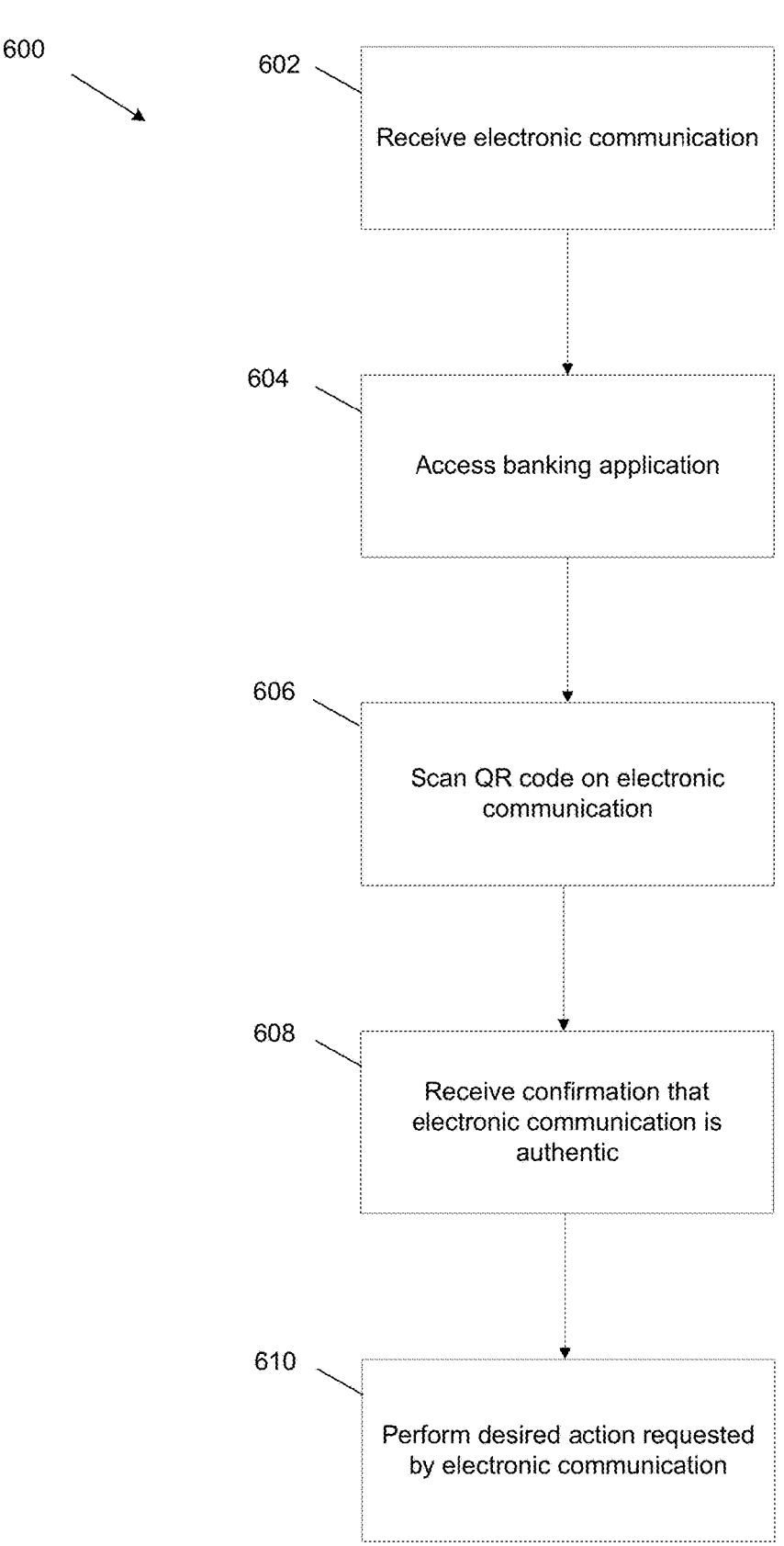
FIG. 6 shows an example method implemented by the client device of FIG. 3.

Referring now to FIG. 6, an example method 600 for the individual to use the system 100 is shown.

At operation 602, an electronic communication is received by the individual. As noted, this can take various forms, such as the electronic mail 302 received by a mail program on the client device 102.

Next, at operation 604, the banking application is launched on the client device 102. For instance, the individual can access the banking application on the client device 102, which can be a smartphone, tablet, laptop, etc.

At operation 606, the QR code 310 associated with the electronic communication is scanned by the banking application. For instance, the individual can scan the QR code 310 using the camera of the client device 102, as controlled by the banking application.

Next, at operation 608, the client device 102 receives confirmation from the server device 112 that the electronic mail 302 is authentic. Assuming it is, control is finally passed to operation 610, and the action requested by the electronic mail 302 (e.g., confirmation of the individual's address) is performed by the client device 102.

Figure 7:
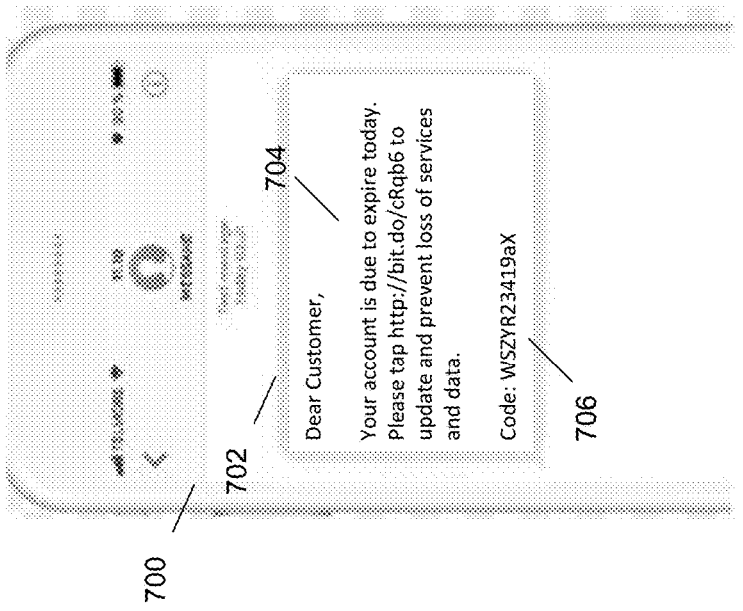
FIG. 7 shows another example graphical user interface of the client device of the system of FIG. 1.

Referring now to FIG. 7, another example interface 700 of the client device 102. The interface 300 includes an example text message 702 that is received by the individual on the client device 102. The text message 702 (sent via SMS) includes a message 704 for the individual, which explains the purpose of the communication. In this instance, the text message 702 was sent to request that the individual update her account before it expires.

In this instance, the text message 702 cannot easily carry a QR code due to the nature of SMS. So, instead of the QR code 310, the text message 702 includes a validation code 706 in the text message 702 that can be used to validate the authenticity of the text message 702. Similar to the QR code 310 described above, the validation code 706 is a series of letters, numbers, and/or symbols that can be sent through SMS to allow the individual to authenticate the text message 702.

For instance, the individual can access the banking application and type (or copy) the validation code 706 into the banking application. The banking application can thereupon communicate with the fraud validator module 204 to authenticate the validation code 706. This can be done by querying the notification database 114 to access all the information associated with the communication that is stored therein. The fraud validator module 204 thereupon compares the data provided by the client device 102 (e.g., validation code 706, telephone number associated with the client device 102, time/date sent, etc.) with the data in the entry from the notification database 114.

Should the validation code 706 and other contextual information associated with the text message 702 match the data in the notification entry sufficiently, the fraud validator module 204 can indicate that the text message 702 has been authenticated and assist the individual with updating her account before expiration. However, if the data does not sufficiently correspond to the relevant notification entry, the fraud validator module 204 can calculate a sufficiently high fraud score, which causes the fraud validator module 204 to indicate that the text message 702 is fraudulent.

Since the validation code 706 in the text message 702 is not encrypted, it is possible for a bad actor to obtain a validation code that has been used before and is a valid code in the notification database 114. However, the risk of this occurring is mitigated in several ways. For instance, the validation codes can be limited to a single use, so a subsequent presentation of a validation code that has already been used will trigger a greater fraud score by the fraud validator module 204. Further, the fraud validator module 204 uses the fraud score along with other contextual information associated with the electronic communication to authenticate it. So, even if the validation code is correct, the person receiving the communication and/or the date/time of the communication will not match the entry in the notification database 114. This will again cause a greater fraud score to be generated by the fraud validator module 204.

Similarly, as noted previously, the data associated with the QR code 310 is encrypted. This minimizes the risk that a nefarious actor can generate fraudulent QR codes and/or steal a valid QR code to use with another electronic communication for similar reasons to those provided above.

Figure 8:
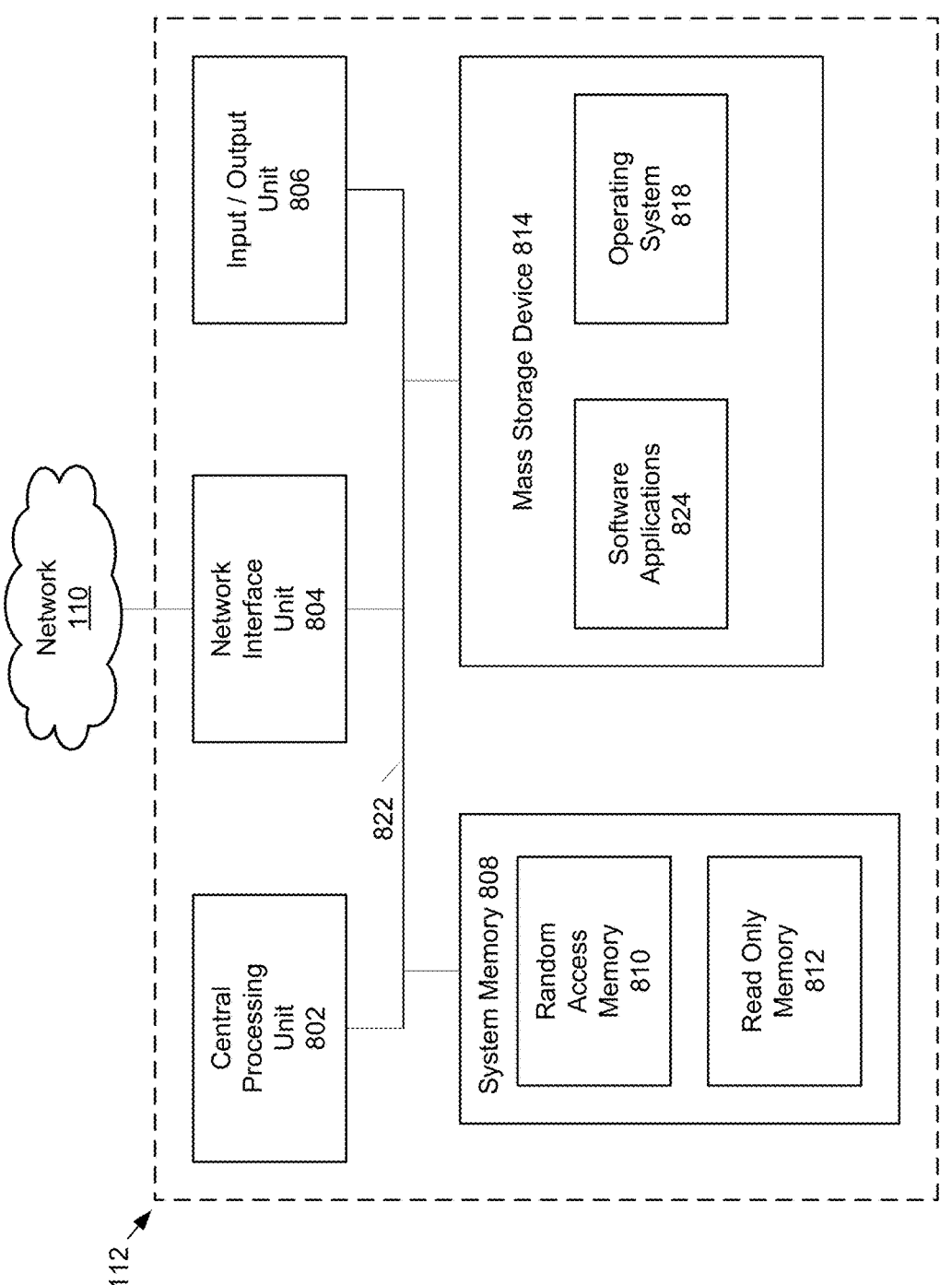
FIG. 8 shows example physical components of the server device of FIG. 2.

As illustrated in the embodiment of FIG. 8, the example server device 112, which provides authentication of the electronic communications, can include at least one central processing unit ("CPU") 802, a system memory 808, and a system bus 822 that couples the system memory 808 to the CPU 802. The system memory 808 includes a random-access memory ("RAM") 810 and a read-only memory ("ROM") 812. A basic input/output system containing the basic routines that help transfer information between elements within the server device 112, such as during startup, is stored in the ROM 812. The server device 112 further includes a mass storage device 814. The mass storage device 814 can store software instructions and data. A central processing unit, system memory, and mass storage device similar to that in FIG. 8 are also included in other computing devices disclosed herein (e.g., the devices 102, 104, 106, 112).

The mass storage device 814 is connected to the CPU 802 through a mass storage controller (not shown) connected to the system bus 822. The mass storage device 814 and its associated computer-readable data storage media provide non-volatile, non-transitory storage for the server device 112. Although the description of computer-readable data storage media contained herein refers to a mass storage device, such as a hard disk or solid-state disk, it should be appreciated by those skilled in the art that computer-readable data storage media can be any available non-transitory, physical device, or article of manufacture from which the central display station can read data and/or instructions.

Computer-readable data storage media include volatile and non-volatile, removable, and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid-state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server device 112.

According to various embodiments of the invention, the server device 112 may operate in a networked environment using logical connections to remote network devices through network 110, such as a wireless network, the Internet, or another type of network. The server device 112 may connect to network 110 through a network interface unit 804 connected to the system bus 822. It should be appreciated that the network interface unit 804 may also be utilized to connect to other types of networks and remote computing systems. The server device 112 also includes an input/output controller 806 for receiving and processing input from a number of other devices, including a touch user interface display screen or another type of input device. Similarly, the input/output controller 806 may provide output to a touch user interface display screen or other output devices.

As mentioned briefly above, the mass storage device 814 and the RAM 810 of the server device 112 can store software instructions and data. The software instructions include an operating system 818 suitable for controlling the operation of the server device 112. The mass storage device 814 and/or the RAM 810 also store software instructions and applications 824, that when executed by the CPU 802, cause the server device 112 to provide the functionality of the server device 112 discussed in this document.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A computer system for authenticating an electronic communication, comprising:

one or more processors; and non-transitory computer-readable storage media encoding instructions which, when executed by the one or more processors, cause the computer system to:

generate a validation code for the electronic communication;

accept the validation code and other contextual information from a client device associated with the electronic communication to determine an authenticity of the electronic communication;

access, using the validation code, a notification entry associated with the electronic communication stored in a notification database, wherein the notification entry includes contextual information associated with the electronic communication;

compare the contextual information from the client device with the contextual information from the notification entry to identify whether a match occurs;

use artificial intelligence, trained on historical communications that have been determined to be authentic and fraudulent, to calculate a fraud score;

increase the fraud score when the validation code has been previously used; and determine the authenticity of the electronic communication based upon the fraud score and results of the match.

2. The computer system of claim 1, comprising further instructions which, when executed by the one or more processors, cause the computer system to:

encrypt the validation code; and generate a quick-response code that incorporates the validation code once encrypted.

3. The computer system of claim 2, comprising further instructions which, when executed by the one or more processors, causes the computer system to incorporate the quick- response code into the electronic communication.

4. The computer system of claim 2, comprising further instructions which, when executed by the one or more processors, causes the computer system to append the validation code to a text message.

5. The computer system of claim 1, wherein the electronic communication is an electronic mail or a text message.

6. The computer system of claim 1, comprising further instructions which, when executed by the one or more processors, cause the computer system to:

compare the fraud score to a threshold; and determine the electronic communication is fraudulent when the fraud score exceeds the threshold.

7. The computer system of claim 1, comprising further instructions which, when executed by the one or more processors, causes the computer system to:

receive information associated with fraudulent electronic communications; and identify trends associated with the fraudulent electronic communications.

8. The computer system of claim 1, comprising further instructions which, when executed by the one or more processors, cause the computer system to:

manage users who are authorized to access the computer system; and manipulate thresholds associated with fraud scores.

9. A method for authenticating an electronic communication, the method comprising:

generating a validation code for the electronic communication;

accepting the validation code and other contextual information from a client device associated with the electronic communication to determine an authenticity of the electronic communication;

accessing, using the validation code, a notification entry associated with the electronic communication stored in a notification database, wherein the notification entry includes contextual information associated with the electronic communication;

comparing the contextual information from the client device with the contextual information from the notification entry to identify whether a match occurs;

using artificial intelligence, trained on historical communications that have been determined to be authentic and fraudulent, to calculate a fraud score;

increasing the fraud score when the validation code has been previously used; and determining the authenticity of the electronic communication based upon the fraud score and results of the match.

10. The method of claim 9, further comprising:

encrypting the validation code; and generating a quick-response code that incorporates the validation code once encrypted.

11. The method of claim 10, further comprising incorporating the quick-response code into the electronic communication.

12. The method of claim 10, further comprising appending the validation code to a text message.

13. The method of claim 9, wherein the electronic communication is an electronic mail or a text message.

14. The method of claim 9, further comprising:

comparing the fraud score to a threshold; and determining the electronic communication is fraudulent when the fraud score exceeds the threshold.

15. The method of claim 9, further comprising:

receiving information associated with fraudulent electronic communications; and identifying trends associated with the fraudulent electronic communications.

16. The method of claim 9, further comprising:

managing users who are authorized to access the method; and manipulating thresholds associated with fraud scores.

* * * * *